(12) United States Patent
Bradley (10) Patent No.: US 6,191,893 B1
(45) Date of Patent: Feb. 20, 2001

(54) COLOR PROJECTION DISPLAY SYSTEM WITH IMPROVED HUE VARIATION

(75) Inventor: Ralph Bradley, Maryville, TN (US)

(73) Assignee: Philips Electronics North America Corporation, New York, NY (US)

( * ) Notice: Under 35 U.S.C. 154(b), the term of this patent shall be extended for 0 days.

(21) Appl. No.: 09/326,511

(22) Filed: Jun. 4, 1999

(51) Int. Cl.$^7$ ................................................. G02B 27/14
(52) U.S. Cl. ..................... 359/634; 359/618; 359/629; 353/31; 349/5; 349/8; 348/762; 348/756
(58) Field of Search ..................... 359/618, 629, 359/634, 487; 353/31, 33, 34, 37; 349/5, 8; 348/762, 767, 756

(56) References Cited

U.S. PATENT DOCUMENTS

| | | | |
|---|---|---|---|
| 4,962,997 | * 10/1990 | Baldwin | 359/618 |
| 5,105,263 | * 4/1992 | Shioda | 348/756 |
| 5,262,895 | * 11/1993 | LaDuke et al. | 359/634 |
| 5,298,986 | * 3/1994 | Owada et al. | 348/762 |
| 5,663,817 | * 9/1997 | Frapin et al. | 349/5 |
| 5,999,321 | * 12/1999 | Bradley | 359/634 |

\* cited by examiner

*Primary Examiner*—Loha Ben
(74) *Attorney, Agent, or Firm*—John C. Fox (57) ABSTRACT

In a color projection display system having a source of white light, an electro-optic light modulator for modulating the light in accordance with a display signal, a projection lens, and dichroic filters for separating the white light into color components prior to modulation, and for recombining the modulated color components prior to projection, the color uniformity of the display is improved by designing the filters to have different cut-off wavelengths of separation and recombination for at least one of the color components.

14 Claims, 12 Drawing Sheets

COLOR PROJECTION DISPLAY SYSTEM WITH IMPROVED HUE VARIATION

BACKGROUND OF THE INVENTION

This invention was made with United States Government support under Award 70NANB5H1070, entitled "High Information Content Display Technology", awarded by the Department of Commerce through its National Institute of Science and Technology (NIST).

This invention relates to color projection display systems employing one or more electro-optic light modulators, and more particularly relates to such a system which employs a white light illumination source, and dichroic filters to separate the white light into primary color components, and to recombine these components.

Most color projection display systems employing one or more electro-optic light modulators, also employ a single white light illumination source, a first set of dichroic filters arranged to separate the white light from the source into primary (red, blue and green) color components, and a second set of dichroic filters to recombine the components after modulation.

The design of such systems dictates that the dichroic filters be inclined at an angle to the paths of the light beams, usually 45 degrees. These inclined surfaces in the optical paths break what would otherwise be a symmetrical arrangement of light rays with respect to the top and bottom (or left and right, depending on the layout) of modulator panel(s), and corresponding asymmetry of light rays in the projected image.

This asymmetry, and the well-known sensitivity of the transmission characteristics of such filters to the incident angles of the light rays striking their surfaces, results in a variation of cut-off wavelength of the filters, and a consequent variation in hue of the primary colors across the display image, the direction of variation (width or height) depending on the direction of tilt of the dichroic filters in the lightpath.

In co-pending U.S. patent application Ser. No. 09/100,829 filed Jun. 19, 1998, now U.S. Pat. No. 5,999,321, the specification of which is incorporated herein by reference, dichroic filters with reduced angle sensitivity and sharper cut-off wavelengths are described. While use of such improved filters in a color projection display system reduces hue variation, appreciable hue variation can still occur.

OBJECTS AND SUMMARY OF THE INVENTION

It is an object of the invention to provide a color projection display system employing dichroic filters for color separation and recombination, in which the display exhibits improved hue variation.

According to the invention, in a color projection display system having a source of white light, an electro-optic light modulator for modulating the light in accordance with a display signal, a projection lens, and dichroic filters for separating the white light into color components prior to modulation, and for recombining the modulated color components prior to projection, the hue variation of the display is improved by designing the filters to have different cut-off wavelengths of separation and recombination for at least one of the color components.

A color projection display system of the invention comprises: a white light illumination source, at least one electro-optic light modulator, and a projection lens, the system also comprising a first set of dichroic filters to separate the white light into color components, each of the filters of the a first set having at least one cut-off wavelength for separating at least one color component, and a second set of dichroic filters to recombine these components, each of the dichroic filters of the second set having at least one cut-off wavelength for recombining at least one color component, characterized in that the cut-off wavelength for separation of at least one color component is different from the cut-off wavelength for recombination of that color component.

In the preferred embodiments, the color projection display system employs two dichroic filters in the first set for separating the white light into red (R), blue (B) and green (G) components, and two dichroic filters in the second set for recombining the color components, and the cut-off wavelengths for separation and recombination of each color component are different. These differences can range from 5 to 20 nanometers.

As used herein, the term "cut-off wavelength" of a dichroic filter means the wavelength at which the filter is 50% transmissive and 50% reflective at the design angle of incidence of the filter.

There are six different orders in which the light can be separated prior to modulation in such a three-color system. For each of these orders, there is a preferred relationship between the cut-off wavelengths of the separation and recombination filters.

For the order of separation, blue, green, red, designated herein BGR, a first filter of the first set (Filter I) separates blue light from green and red light, a second filter of the first set (Filter II) separates green light from red light, a first filter of the second set (Filter III) recombines green light and blue light, and a second filter of the second set (Filter IV) recombines red light with green and blue light; the cut-off wavelength Ic of Filter I is less than the cut-off wavelength IIIc of Filter III, and the cut-off wavelength IIc of Filter II is greater than the cut-off wavelength IVc of Filter IV.

For the order of separation RGB, a first filter of the first set (Filter I) separates red light from green and blue light, a second filter of the first set (Filter II) separates green light from blue light, a first filter of the second set (Filter III) recombines red light and green light, and a second filter of the second set (Filter IV) recombines blue light with green and red light; the cut-off wavelength Ic of Filter I is less than the cut-off wavelength IIIc of Filter III, and the cut-off wavelength IIc of Filter II is greater than the cut-off wavelength IVc of Filter IV.

For the order of separation BRG, a first filter of the first set (Filter A) separates blue light from green and red light, a second filter of the first set (Filter B) separates red light from green light, a first filter of the second set (Filter C) recombines blue light and red light, and a second filter of the second set (Filter D) recombines blue and red light with green light; and the cut-off wavelength Ac of Filter A is less than the cut-off wavelength Dc of Filter D, and the cut-off wavelength Bc of Filter B is greater than the cut-off wavelength Dc of Filter D.

For the order of separation GRB, a first filter of the first set (Filter A) separates green light from blue and red light, a second filter of the first set (Filter B) separates red light from blue light, a first filter of the second set (Filter C) recombines green light and red light, and a second filter of the second set (Filter D) recombines green and red light with blue light; and the cut-off wavelength Ac of Filter A is less than the cut-off wavelength Bc of Filter B, and the cut-off wavelength Ac of Filter A is greater than the cut-off wavelength Cc of Filter C.

For the order of separation RBG, a first filter of the first set (Filter A) separates red light from green and blue light, a second filter of the first set (Filter B) separates blue light from green light, a first filter of the second set (Filter C) recombines red light and blue light, and a second filter of the second set (Filter D) recombines blue and red light with green light; and the cut-off wavelength Bc of Filter B is less than the cut-off wavelength Dc of Filter D, and the cut-off wavelength Ac of Filter A is greater than the cut-off wavelength Dc of Filter D.

For the order of separation GBR, a first filter of the first set (Filter A) separates green light from blue and red light, a second filter of the first set (Filter B) separates blue light from red light, a first filter of the second set (Filter C) recombines green light with blue light, and a second filter of the second set (Filter D) recombines red light with blue and green light; and the cut-off wavelength Ac of Filter A is less than the cut-off wavelength Cc of Filter C, and the cut-off wavelength Ac of Filter A is less than the cut-off wavelength Bc of Filter B.

In the first two orders of separation listed above, RGB and BGR, all of the filters are either short wave pass (SWP) or long wave pass (LWP) filters, while in the third, fourth, fifth and sixth orders of separation, BRG, GRB, RBG and GBR, one of the filters is a band pass (BP) filter. In the third and fifth BP-filter embodiments, filter C combines colors which are not adjacent in the color spectrum, ie, red and blue. In these two embodiments, the cut-off wavelength of filter C is not critical, and may have a value intermediate the high and low cut-off wavelengths of the other filters.

DESCRIPTION OF THE PREFERRED EMBODIMENTS

There are 24 different ways to separate white light into red, blue and green light, and to recombine the red, blue and green light into white light using dichroic filters. There are six possible orders of separation and recombination, as follows:

BGR: separate blue (B) from green (G) and red (R);
separate G from R;
recombine B and G;
recombine R with B and G.
RGB: separate R from G and B;
separate G from B;
recombine R and G;
recombine B with R and G.
BRG: separate B from R and G;
separate R from G;
recombine B and R;
recombine G with B and R.
GRB: separate G from R and B;
separate R from B;
recombine G and R;
recombine B with G and R.
RBG: separate R from B and G;
separate B from G;
recombine R and B;
recombine G with R and B.
GBR: separate G from B and R;
separate B from R;
recombine G and B;
recombine R with G and B.

Of these six possible orders of separation and recombination, the first two require only short wave pass (SWP) and long wave pass (LWP) filters, while the latter four also require the use of a band pass (BP) filter, to either separate G from R and B, or to recombine G with R and B.

Each of the above separation and recombination steps is generally accomplished using one filter. In such a four-filter scheme, the filters are designated A, B, C, D, in the order in which the middle color encounters them. Filter A, the first filter, separates one color from two others; filter D, the last filter, combines one color with two others; and filters B and C, the middle filters, either separate two colors or recombine two colors. Each filter may have subtle effects on the color uniformity of each color.

For each of the six possible orders of separation listed above, there are two possible ways in which white light can encounter filter A, and two possible ways in which recombined white light can encounter filter D, ie, these filters can each perform their respective separation and recombination functions be either transmission or reflection. These possibilities give rise to four possible variants as follows:

0 first separation is by reflection; last recombination is by transmission.

1 first separation is by transmission; last recombination is also by transmission.

2 first separation is by reflection; last recombination is also by reflection.

3 first separation is by transmission; last recombination is by reflection.

These four variants, together with the 6 possible orders of separation and recombination, result in 24 possible ways to separate white light into R, G and B light, and to recombine the R, G and B light into white light, using a four-filter system.

These four variants have little or no effect on the optimal placement of the cut-off wavelengths of the filters in accordance with the teachings of the invention.

FIGS. 1–6 are schematic diagrams of optical paths for variant v0 of the six different orders of separation listed.

Figure 1:
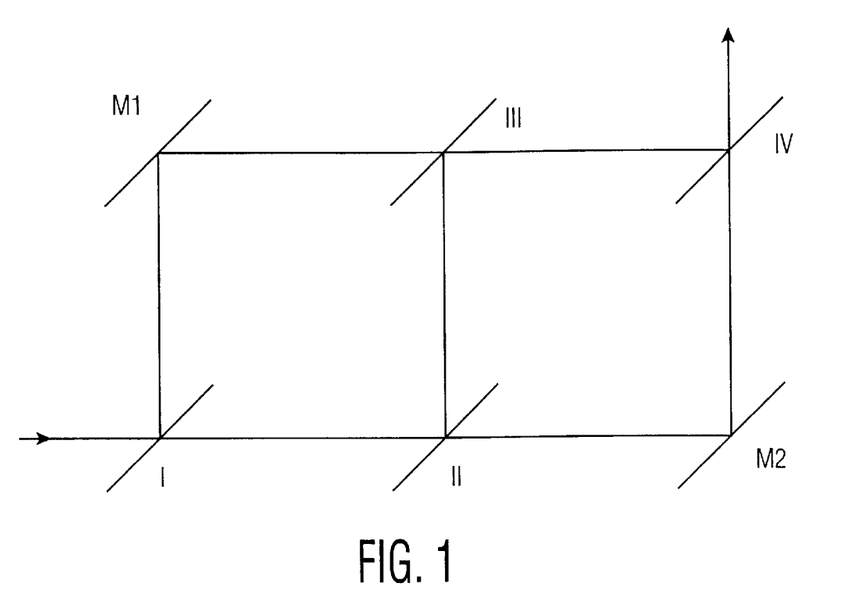
FIGS. 1–6 are schematic diagrams showing a first variation of the optical paths for the six different orders of separation of R, G and B color components for a color projection display system of the invention.

FIG. 1:BGR:
LWP filter A separates B from G and R by reflecting B and transmitting G and R;
LWP filter B separates G from R by reflecting G and transmitting R;
SWP filter C combines B and G by transmitting B and reflecting G;
LWP filter D combines R with B and G by reflecting B and G and transmitting R.

Figure 2:
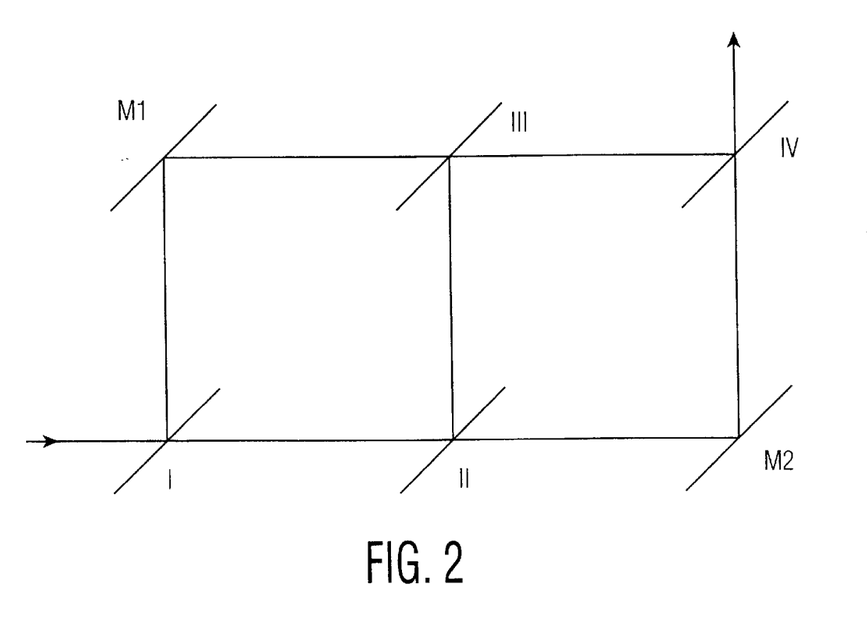

FIG. 2:RGB:
SWP filter A separates R from G and B by reflecting R and transmitting G and B;
SWP filter B separates G from B by reflecting G and transmitting B;

LWP filter C combines R and G by transmitting R and reflecting G;

SWP filter D combines B with R and G by transmitting B and reflecting R and G.

Figure 3:
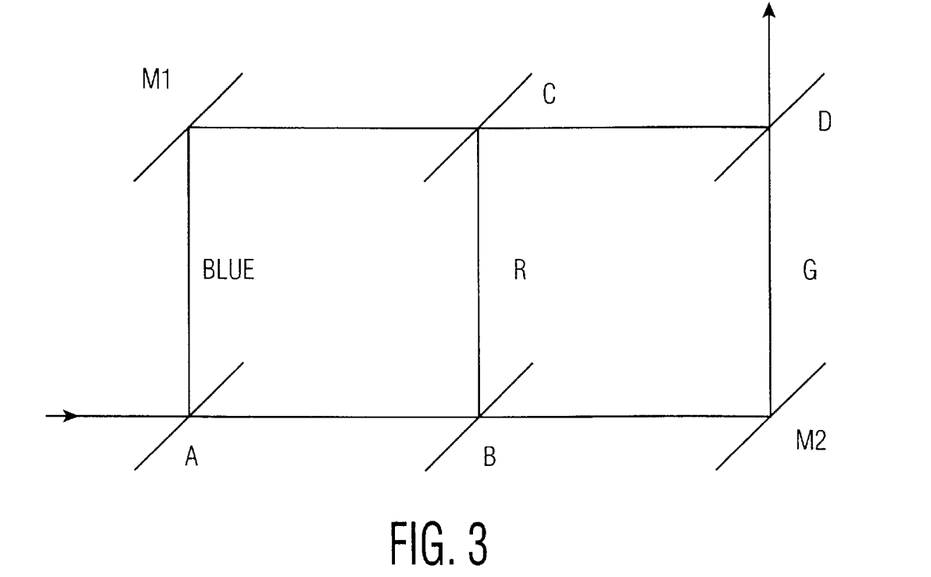

FIG. 3:BRG:

LWP filter A separates B from R and G by reflecting B and transmitting R and G;

SWP filter B separates R from G by reflecting R and transmitting G;

SWP filter combines B and R by reflecting R and transmitting B;

BP filter combines G with B and R by reflecting B and R and transmitting G.

Figure 4:
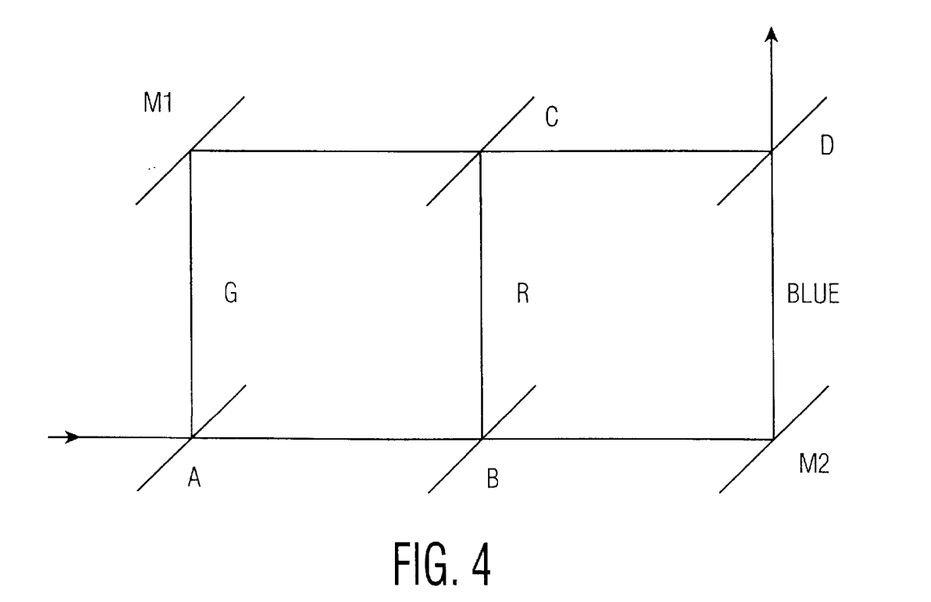

FIG. 4:GRB:

BP filter A separates G from R and B by reflecting G and transmitting R and B;

SWP filter B separates R from B by reflecting R and transmitting B;

SWP filter C combines G and R by transmitting G and reflecting R;

SWP filter D combines B with G and R by transmitting B and reflecting R and G.

Figure 5:
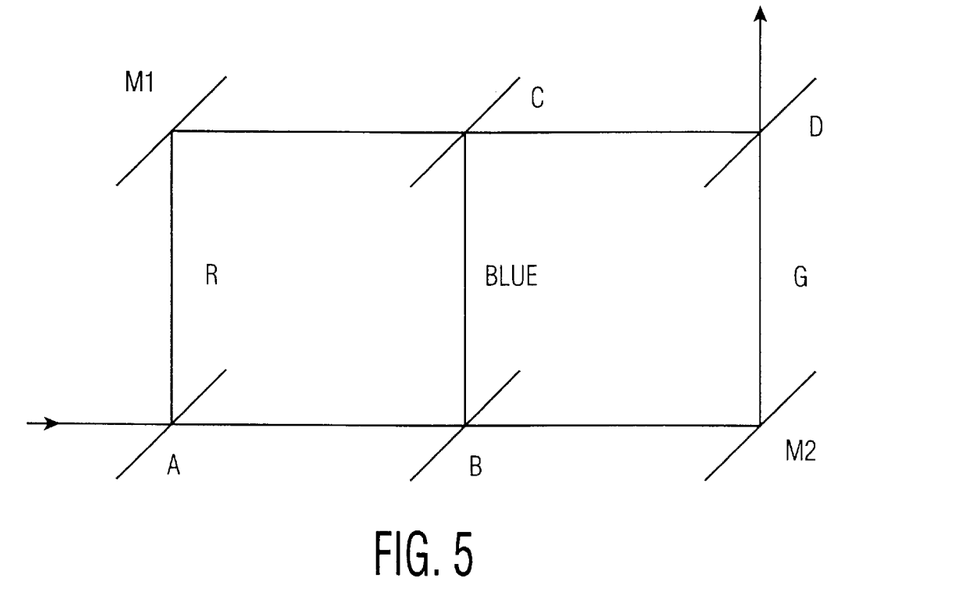

FIG. 5:RBG:

SWP filter A separates R from B and G by reflecting R and transmitting G and B;

LWP filter B separates B from G by reflecting B and transmitting G;

LWP filter C combines R and B by transmitting R and reflecting B;

BP filter D combines G with R and B by transmitting G and reflecting R and B.

Figure 6:
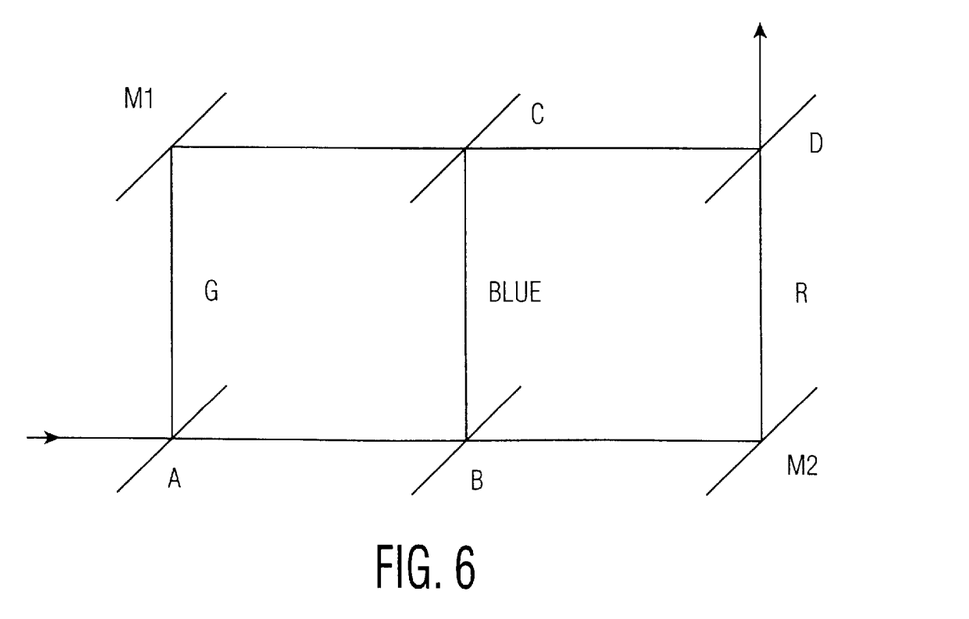

FIG. 6:GBR:

BP filter A separates G from B and R by reflecting G and transmitting R and B;

LWP filter B separates B from R by reflecting B and transmitting R;

LWP filter C combines G and B by transmitting G and reflecting B;

LWP filter D combines R with G and B by transmitting R and reflecting B and G.

Figure 7:
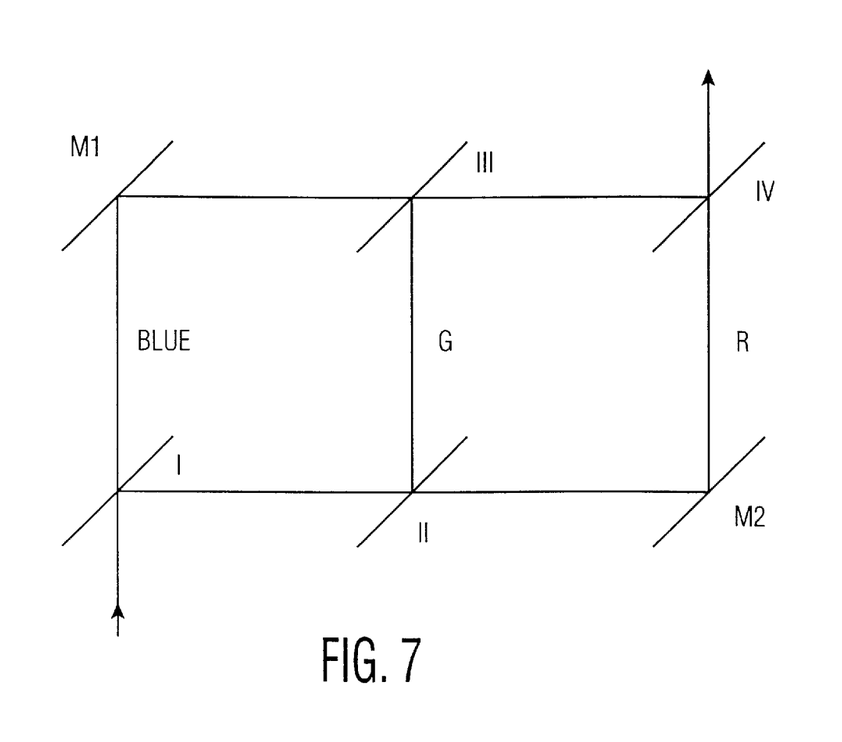
FIGS. 7–9 are schematic diagrams showing three other variations of optical path of FIG. 1.
Figure 8:
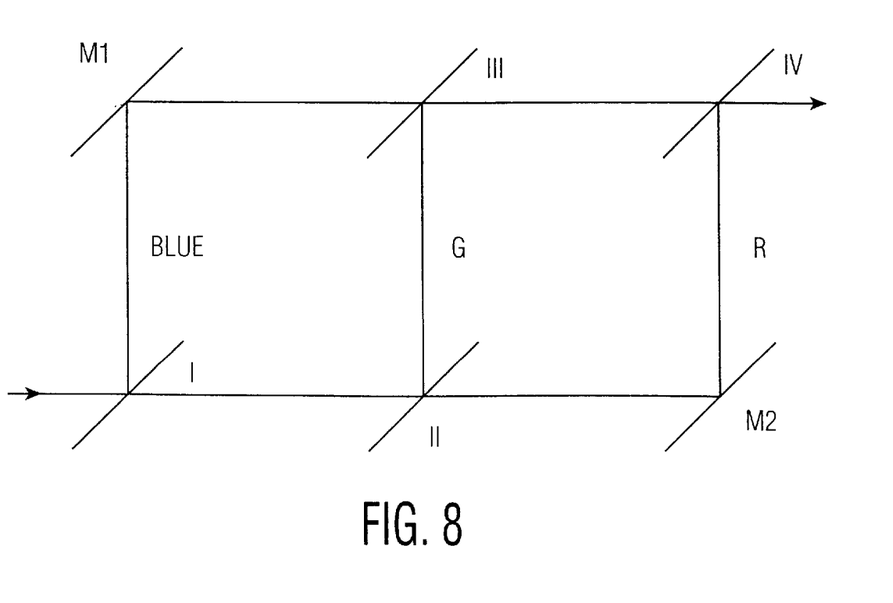
Figure 9:
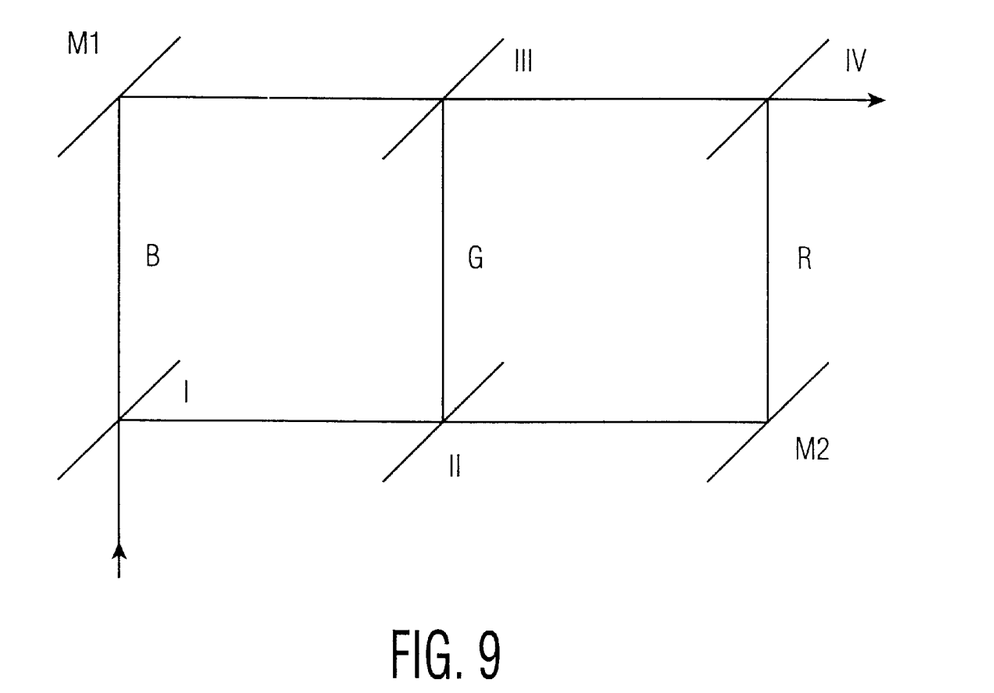

FIGS. 7–9 are schematic diagrams illustrating variations v1–v3 for the first order of separation BGR, variation v0 of which is shown in FIG. 1.

FIG. 7:v1:

SWP filter A separates B from G and R by transmitting B and reflecting G and R;

LWP filter B separates G from R by reflecting G and transmitting R;

SWP filter C combines B and G by transmitting B and reflecting G;

LWP filter D combines R with B and G by reflecting B and G and transmitting R.

FIG. 8:v2:

LWP filter A separates B from G and R by reflecting B and transmitting G and R;

LWP filter B separates G from R by reflecting G and transmitting R;

SWP filter C combines B and G by transmitting B and reflecting G;

SWP filter D combines R with B and G by transmitting B and G and reflecting R.

FIG. 9:v3:

SWP filter A separates B from G and R by transmitting B and reflecting G and R;

LWP filter B separates G from R by reflecting G and transmitting R;

SWP filter C combines B and G by transmitting B and reflecting G;

SWP filter D combines R with B and G by transmitting B and G and reflecting R.

EXAMPLES

Several examples of progressive change in hue across a display surface are presented for different combinations of cut-off relationships of the filter sets for different orders of separation. All examples are for separation of white light into R, G and B components using a first set of two dichroic filters, and recombination using a second set of two dichroic filters, arranged in accordance with variant v0.

The results are based on simulations of the performance of reduced angular shift filters. The simulations were accomplished by tracing rays through a lightpath using a commercially available ray trace program.

For each different combination of filter sets, hue was calculated for each color component and for white at six different points along the height direction of a display surface, and plotted (circular loci) on a conventional CIE chromaticity diagram. EBU/D65 standard hues for the three colors and for white are also shown (triangular loci) for comparison.

Examples 1–4

Separation Order BGR

Figure 10:
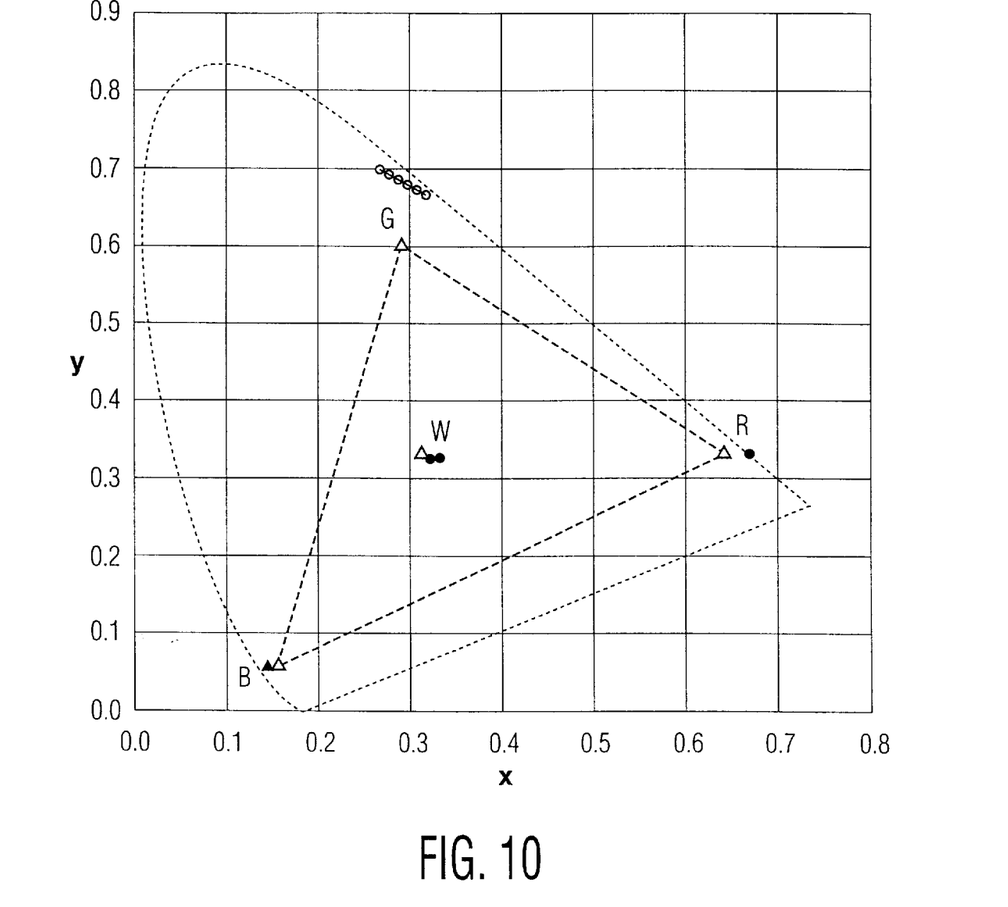
FIGS. 10–15 are CIE chromaticity diagrams showing hue variation across a display surface for different combinations of cut-off relationships for different orders of separation.

Ex. 1—preferred cut-off relationship: I(500 nm)<III(510 nm); II(593 nm)>IV(577 nm); results, shown in FIG. 10, indicate very low hue variation for blue and red, larger variation for green. This is preferred since the eye is more sensitive to hue variations in red and blue than in green.

Figure 11:
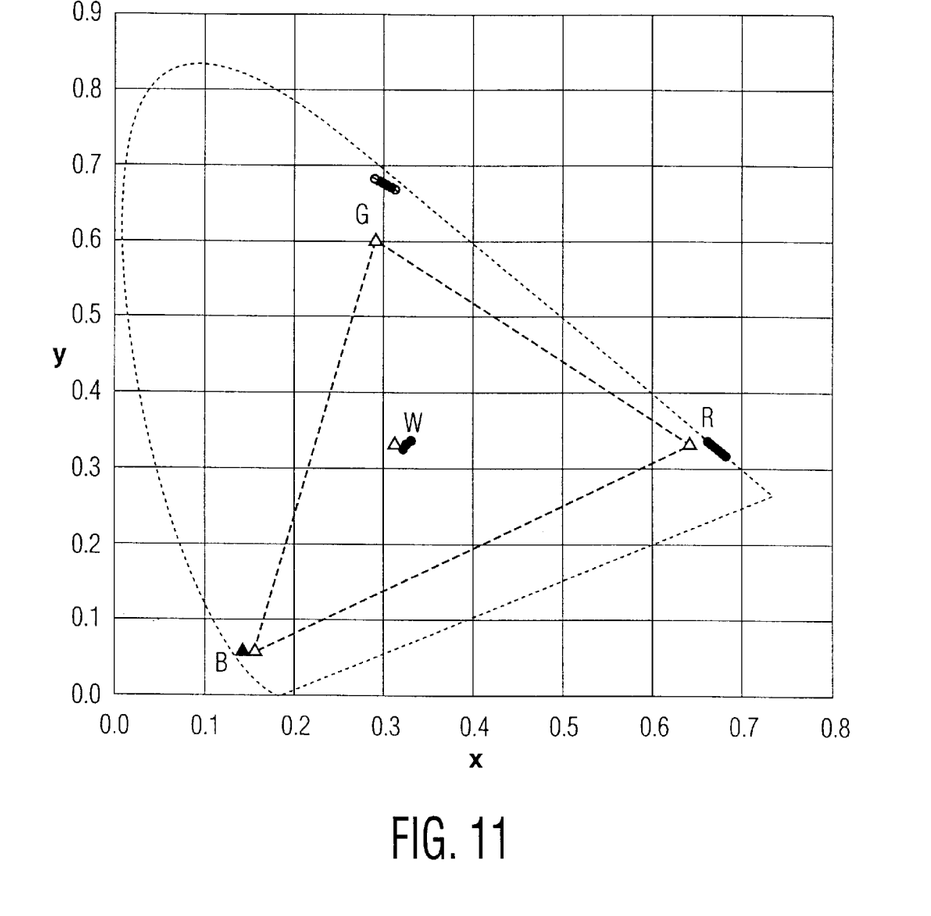

Ex. 2—cut-off relationship: I(500 nm)<III(510 nm); II(577 nm)<IV(593 nm); results, shown in FIG. 11, indicate a reduction in hue variation for green as compared to Ex. 1, but an unacceptable increase in hue variation for red.

Figure 12:
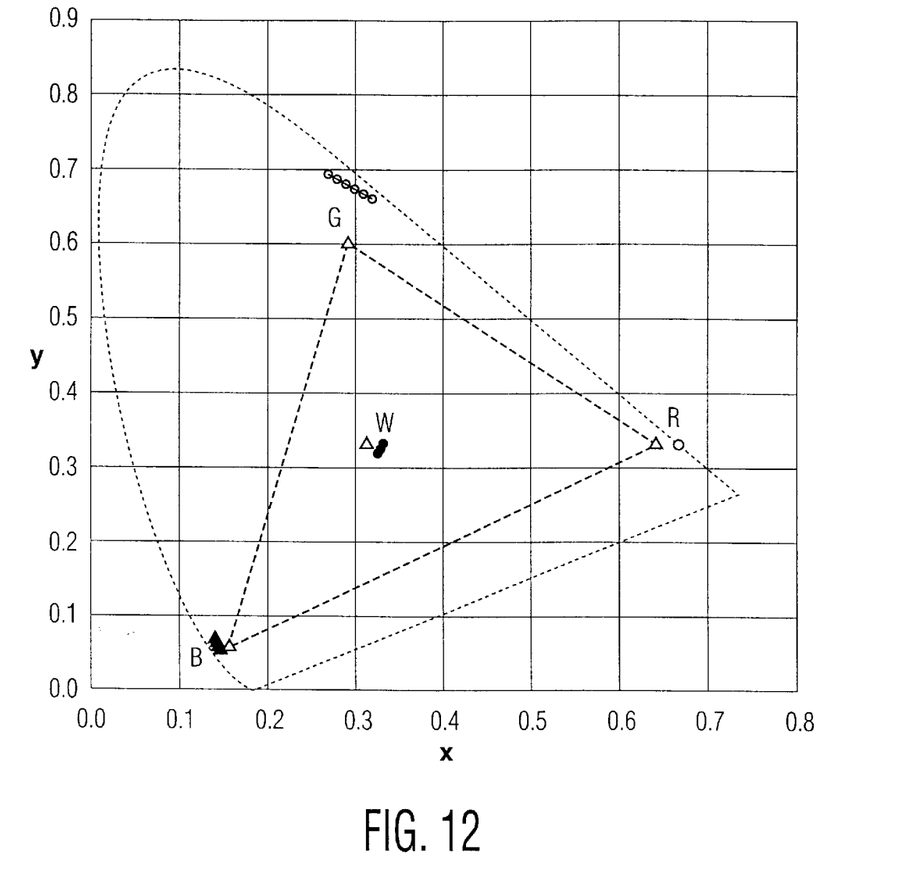

Ex. 3—cut-off relationship: I(510 nm)>III(500 nm); II(593 nm)>IV(577 nm); results, shown in FIG. 12, indicate an unacceptable increase in hue variation for blue.

Figure 13:
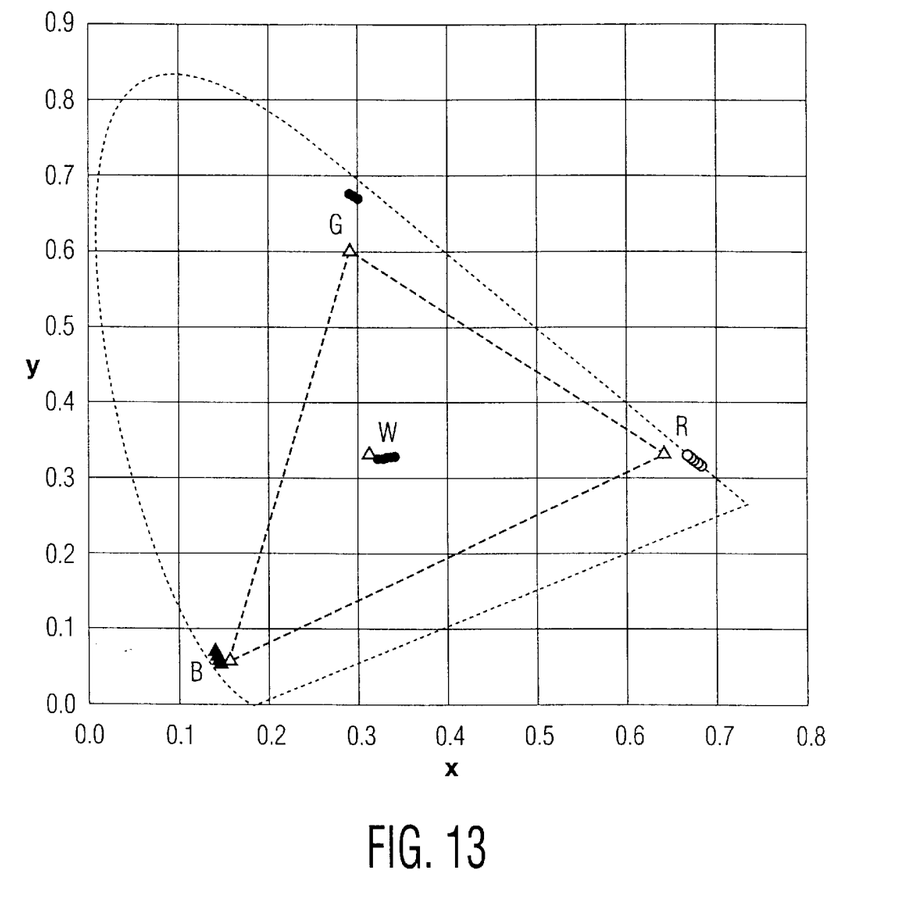

Ex. 4—cut-off relationship: I(510 nm)>III(500 nm); II(593)>IV(577 nm); results, shown in FIG. 13, indicate a decrease in green hue variation, but increases in both red and blue hue variation.

Example 5

Separation Order RGB; Preferred Cut-off Relationship

Figure 14:
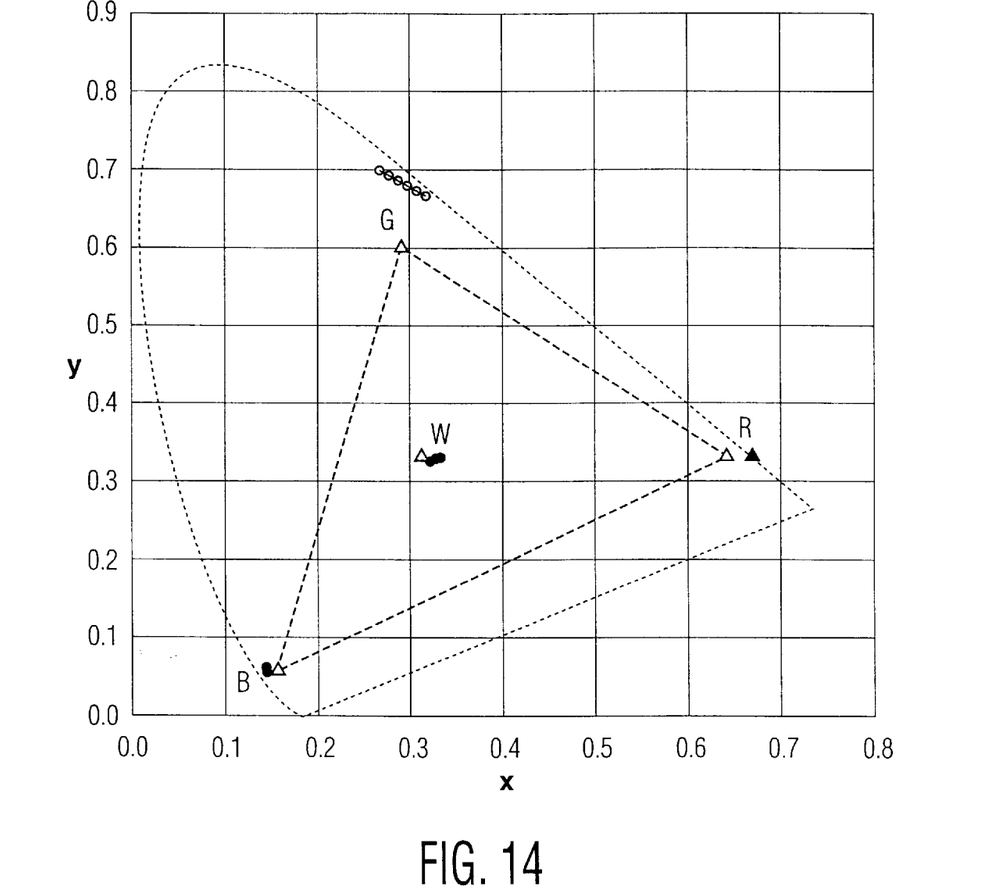

I(577 nm)<III(593 nm); II(510 nm)>IV(500 nm); results, shown in FIG. 14, indicate very small red and blue hue variations.

Example 6

Separation Order RBG; Preferred Cut-off Relationship

Figure 15:
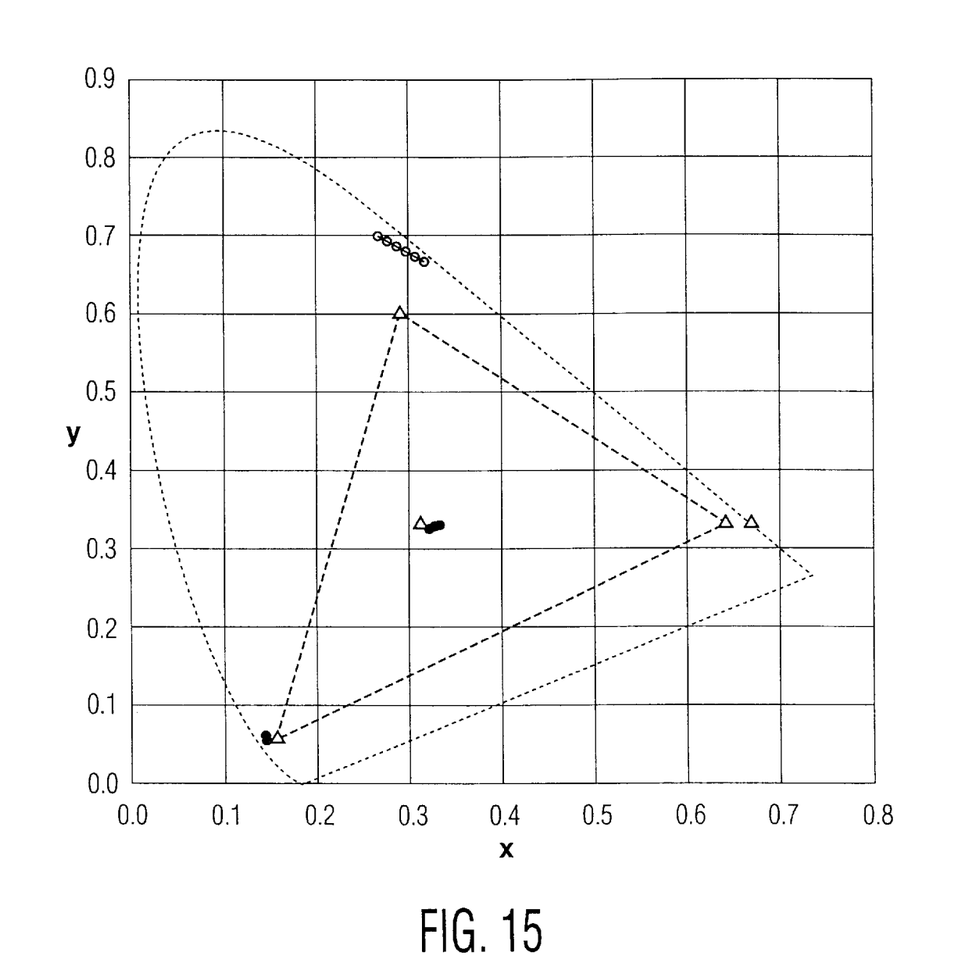

A>D; B<D; results, shown in FIG. 15, indicate very small red and blue hue variations.

Figure 16:
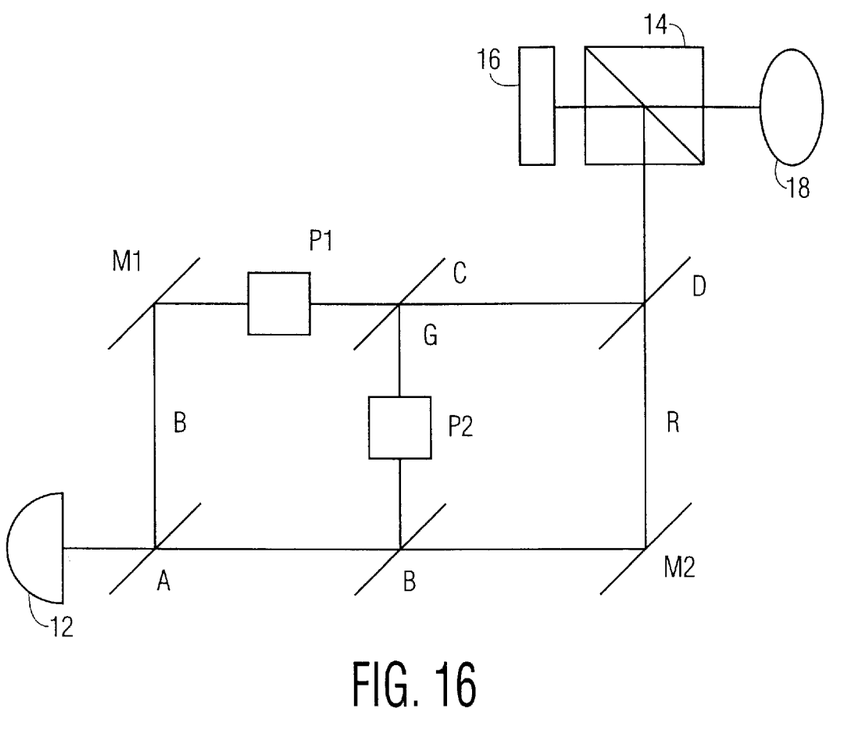
FIG. 16 is a schematic diagram of a scrolling-color projection display system employing dichroic filters in the arrangement of FIG. 1.

FIG. 16 is a schematic diagram of one embodiment of a color projection display system, which is a scrolling-color projection display system employing a single reflective liquid crystal display and dichroic filters arranged as shown in FIG. 1. Light source 12 provides a beam of white light which first encounters dichroic filter A, which separates blue light from green and red light by reflection of the blue light and transmission of the green and red light. The blue light is directed into rotating prism P1 by mirror M1 and then is transmitted by dichroic mirror C and reflected by dichroic filter D into polarizing beam splitter 14, which reflects the beam onto a reflective liquid crystal display 16. Green light is separated from red light and directed to rotating prism P2 by filter B. The green light is then directed into the path of the blue light by filter C, and follows the same path to display 16. The remaining red light encounters rotating prism P3, and is then directed by mirror M2 into the paths of the blue and green beams. The rotating prisms are synchronized in their rotation to provide sequential scrolling of blue, green and red color bands across the display 16. Display 16 modulates the light to produce a color display image, and changes the polarization direction, so that the image-forming rays are passed by the polarizing beam splitter 16 to projection lens 18.

The invention has been described in terms of a limited number of embodiments. Other embodiments, variations of embodiments and art-recognized equivalents will become apparent to those skilled in the art, and are intended to be encompassed within the scope of the invention, as set forth in the appended claims. For example, means other than rotating prisms may be used for sequentially scrolling colors across an electro-optic display, such as a rotating color wheel, a rotating color drum, or electronic color shutters.

What is claimed is:

1. A color projection display system comprising:
   a white light illumination source, a projection lens, and at least one electro-optic light modulator disposed in an optical path between said illumination source and said projection lens,
   a first set of dichroic filters disposed between said illumination source and said at least one electro-optic light modulator, to separate the white light into color components, one of the filters of the first set having at least a first given cut-off wavelength for separating a first color component from at least one of the other color components, and another of the filters of the first set having at least a second given cut-off wavelength for separating a second given color component from at least one of the other color components,
   a second set of dichroic filters to recombine these components, and
   means for causing said light modulator to modulate at least one of said color components,
   characterized in that one of the dichroic filters of the second set combines at least said first color component with at least one of the other color components, and has a third given cut-off wavelength different from said first given cut-off wavelength and different from said second given cut-off wavelength.

2. The color projection display system of claim 1 in which there are two dichroic filters in the first set, and two dichroic filters in the second set.

3. The color projection display system of claim 2 in which the cut-off wavelengths for separation and recombination of each color component are different.

4. The color projection display system of claim 3 in which the two filters of the first set separate the white light into three color components, and the two filters of the second set recombine the three color components into white light.

5. The color projection display system of claim 4 in which:
   (a) the white light is separated into red (R), green (G) and blue (B) color components in an order of separation of either RGB or BGR;
   (b) a first filter of the first set (Filter I) separates blue light from green and red light, a second filter of the first set (Filter II) separates green light from red light, a first filter of the second set (Filter III) recombines green light and blue light, and a second filter of the second set (Filter IV) recombines red light and green light; and
   (c) the cut-off wavelength Ic of Filter I is less than the cut-off wavelength IIIc of Filter III, and the cut-off wavelength IIc of Filter II is greater than the cut-off wavelength IVc of Filter IV.

6. The color projection display system of claim 4 in which:
   (a) the white light is separated into red (R), green (G) and blue (B) color components in an order of separation BRG;
   (b) a first filter of the first set (Filter A) separates blue light from green and red light, a second filter of the first set (Filter B) separates red light from green light, a first filter of the second set (Filter C) recombines blue light and red light, and a second filter of the second set (Filter D) recombines blue and red light with green light; and
   (c) the cut-off wavelength Ac of Filter A is less than the cut-off wavelength Dc of Filter D, and the cut-off wavelength Bc of Filter B is greater than the cut-off wavelength Dc of Filter D.

7. The color projection display system of claim 4 in which:
   (a) the white light is separated into red (R), green (G) and blue (B) color components in an order of separation GRB;
   (b) a first filter of the first set (Filter A) separates green light from blue and red light, a second filter of the first set (Filter B) separates red light from blue light, a first filter of the second set (Filter C) recombines green light and red light, and a second filter of the second set (Filter D) recombines green and red light with blue light; and
   (c) the cut-off wavelength Ac of Filter A is less than the cut-off wavelength Bc of Filter B, and the cut-off wavelength Ac of Filter A is greater than the cut-off wavelength Cc of Filter C.

8. The color projection display system of claim 4 in which:
   (a) the white light is separated into red (R), green (G) and blue (B) color components in an order of separation RBG;
   (b) a first filter of the first set (Filter A) separates red light from green and blue light, a second filter of the first set (Filter B) separates blue light from green light, a first filter of the second set (Filter C) recombines red light and blue light, and a second filter of the second set (Filter D) recombines blue and red light with green light; and
   (c) the cut-off wavelength Bc of Filter B is less than the cut-off wavelength Dc of Filter D, and the cut-off wavelength Ac of Filter A is greater than the cut-off wavelength Dc of Filter D.

9. The color projection display system of claim 4 in which:
- (a) the white light is separated into red (R), green (G) and blue (B) color components in an order of separation GBR;
- (b) a first filter of the first set (Filter A) separates green light from blue and red light, a second filter of the first set (Filter B) separates blue light from red light, a first filter of the second set (Filter C) recombines green light with blue light, and a second filter of the second set (Filter D) recombines red light with blue and green light; and
- (c) the cut-off wavelength Ac of Filter A is less than the cut-off wavelength Cc of Filter C, and the cut-off wavelength Ac of Filter A is less than the cut-off wavelength Bc of Filter B.

10. The color projection display system of anyone of claims 5, 6, 7, 8 and 9 in which the difference in cut-off wavelengths is in the range of about 5 to 20 nanometers.

11. The color projection display system of claim 4 in which the electro-optic light modulator is a reflective liquid crystal display and means are provided for sequentially scrolling the blue, green and red color bands across the display.

12. The color projection display system of claim 1 in which the difference between said third given cut-off wavelength and one of said first given cut-off wavelength and said second given cut-off wavelength is in the range of about 5 to 20 nanometers.

13. The color projection display system of claim 1 in which said first given cut-off wavelength separates said first color component from a color component having a shorter wavelength, and
    said one of the dichroic filters of the second set combines at least said first color component with at least said color component having a shorter wavelength.

14. The color projection display system of claim 13 in which the difference between said third given cut-off wavelength and one of said first given cut-off wavelength and said second given cut-off wavelength is in the range of about 5 to 20 nanometers.

\* \* \* \* \*